(12) United States Patent
Drago et al.

(10) Patent No.: US 7,657,183 B2
(45) Date of Patent: Feb. 2, 2010

(54) METHOD AND APPARATUS FOR HEMISPHERICAL RETARGETING

(75) Inventors: Matthew A. Drago, Albuquerque, NM (US); Jerald A. Hull, Tijeras, NM (US); Theodore I. Kreifels, Sandia Park, NM (US); Joseph N. Paranto, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 464 days.

(21) Appl. No.: 11/603,877

(22) Filed: Nov. 22, 2006

(65) Prior Publication Data

US 2008/0118247 A1    May 22, 2008

(51) Int. Cl.
*H04B 10/00* (2006.01)
(52) U.S. Cl. ..................................... 398/122
(58) Field of Classification Search .......... 398/118–131
See application file for complete search history.

(56) References Cited

U.S. PATENT DOCUMENTS

| 5,502,309 | A | 3/1996 | Davis |
| 5,534,697 | A | 7/1996 | Creekmore et al. |
| 5,627,675 | A | 5/1997 | Davis et al. |
| 5,841,589 | A | 11/1998 | Davis et al. |
| 5,883,713 | A | 3/1999 | Davis et al. |
| 6,072,524 | A | 6/2000 | Davis et al. |
| 6,450,455 | B1 | 9/2002 | Davis |
| 6,501,419 | B2 | 12/2002 | Davis et al. |
| 2004/0151504 | A1* | 8/2004 | Triebes et al. ............... 398/131 |
| 2005/0111084 | A1* | 5/2005 | Mandella ..................... 359/364 |
| 2005/0141897 | A1* | 6/2005 | Takahashi et al. ........... 398/118 |
| 2007/0031150 | A1* | 2/2007 | Fisher et al. ................ 398/128 |
| 2007/0031151 | A1* | 2/2007 | Cunningham et al. ....... 398/131 |

* cited by examiner

*Primary Examiner*—Quan-Zhen Wang
(74) *Attorney, Agent, or Firm*—Gates & Cooper LLP (57) ABSTRACT

A method and apparatus for steering energy over a wide field of view is disclosed. The apparatus comprises a beam steering system for directing a first beam from an optical source across an image plane and a WFOV optical system having the image plane, the WFOV optical system mapping the directed first beam incident on the image plane with a second beam extending angularly across the field of view. The method comprises the steps of directing a first beam from a optical source onto an image plane, optically mapping the directed first beam incident on the image plane with a second beam extending angularly across a field of view, and steering the first beam across the image plane.

21 Claims, 9 Drawing Sheets

METHOD AND APPARATUS FOR HEMISPHERICAL RETARGETING

BACKGROUND OF THE INVENTION

1. Field of the Invention

The present invention relates to systems and methods for directing and receiving optical beams over wide fields of view.

2. Description of the Related Art

For many applications, such as active sensing and laser communications, it is desirable to move a transmitted laser beam rapidly (e.g. within fractions of a second) and accurately across large angular fields of regard of perhaps tens or hundreds of degrees. Currently, this is accomplished through the use of gimbaled beam director and/or fast steering mirrors (FSM).

Gimbals are capable of operating over large fields of regard, but they are incapable of attaining high angular speeds, and hence often do not meet beam direction agility requirements. Even the advanced gimbal systems require time periods in the order of several seconds to slew across an entire hemisphere. When slewing across such large angles, gimbal systems can also induce vibration and consume large amounts of power.

FSMs are capable of high angular rates, but only over a limited angular range, as FSMs typically have a field of regard (FOR) of a few degrees.

Neither gimbal-based systems nor FSM-based systems have the ability to slew beams between targets separated by large angles in a fraction of a second. Further, neither system can simultaneously point multiple beams at targets separated by large angles.

What is needed is a system and method that permits rapid redirection of optical beams over wide fields of view. What is also needed is a system and method that is capable of simultaneously directing multiple beams at targets separated by large angles. The present invention satisfies both of these needs.

SUMMARY OF THE INVENTION

To address the requirements described above, the present invention discloses a method and apparatus for steering energy over a field of view. One embodiment of the apparatus comprises a beam steering system for directing a first beam from an optical source across an image plane and an optical system having the image plane, the optical system mapping the directed first beam incident on the image plane with a second beam extending angularly across the field of view. Another embodiment of the apparatus comprises The method comprises an optical system for directing laser energy and a means for steering said laser energy onto an image plane of said optical system, wherein a displacement of said laser energy on said image plane results in an angular displacement of the laser energy upon exiting said optical system. The method comprises directing a first beam from a optical source onto an image plane, optically mapping the directed first beam incident on the image plane with a second beam extending angularly across a field of view and steering the first beam across the image plane.

In one embodiment, the present invention combines the optics of a hemispherical staring sensor, a FSM, and a laser to create a beam direction system capable of retargeting the laser between any two points within the FOR of the hemispherical sensor within fractions of a second. This system provides angular slew rates and accelerations which are orders of magnitude greater than any current system. This improved performance is also provided without accelerating large masses, which greatly reduces vibration and while reducing power requirements of beam direction system. Both power and weight are limiting factors in the design of space vehicles.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
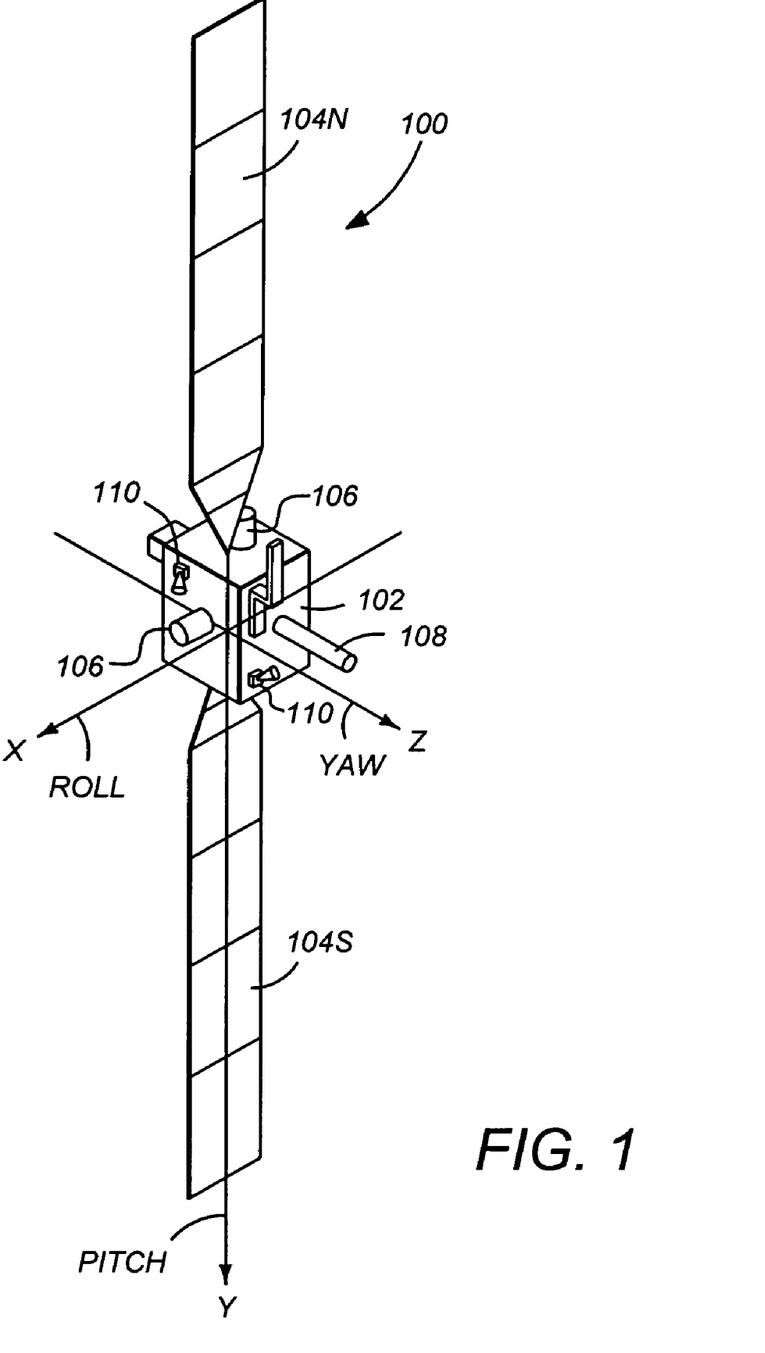
FIG. 1 is a block diagram of a three axis space stabilized satellite or spacecraft.

FIG. 1 illustrates a three-axis stabilized satellite or spacecraft 100 that may be used as a platform for an optical beam device used in a laser communication system or other application. The spacecraft 100 is preferably situated in a stationary orbit about the Earth. The satellite 100 has a main body 102, a pair of solar panels 104, and one or more optical beam devices (OBDs) 106, and a telemetry and command omnidirectional antenna 108 which is aimed at a control ground station. In one embodiment, the optical beam device 106 is a laser communication system. The satellite 100 may also include one or more sensors 110 to measure the attitude of the satellite 100. These sensors may include sun sensors, earth sensors, and star sensors. Since the solar panels are often referred to by the designations "North" and "South", the solar panels in FIG. 1 are referred to by the numerals 104N and 104S for the "North" and "South" solar panels, respectively.

The three axes of the spacecraft 10 are shown in FIG. 1. The pitch axis P lies along the plane of the solar panels 140N and 140S. The roll axis R and yaw axis Y are perpendicular to the pitch axis P and lie in the directions and planes shown. The antenna 108 points to the Earth along the yaw axis Y.

Figure 2:
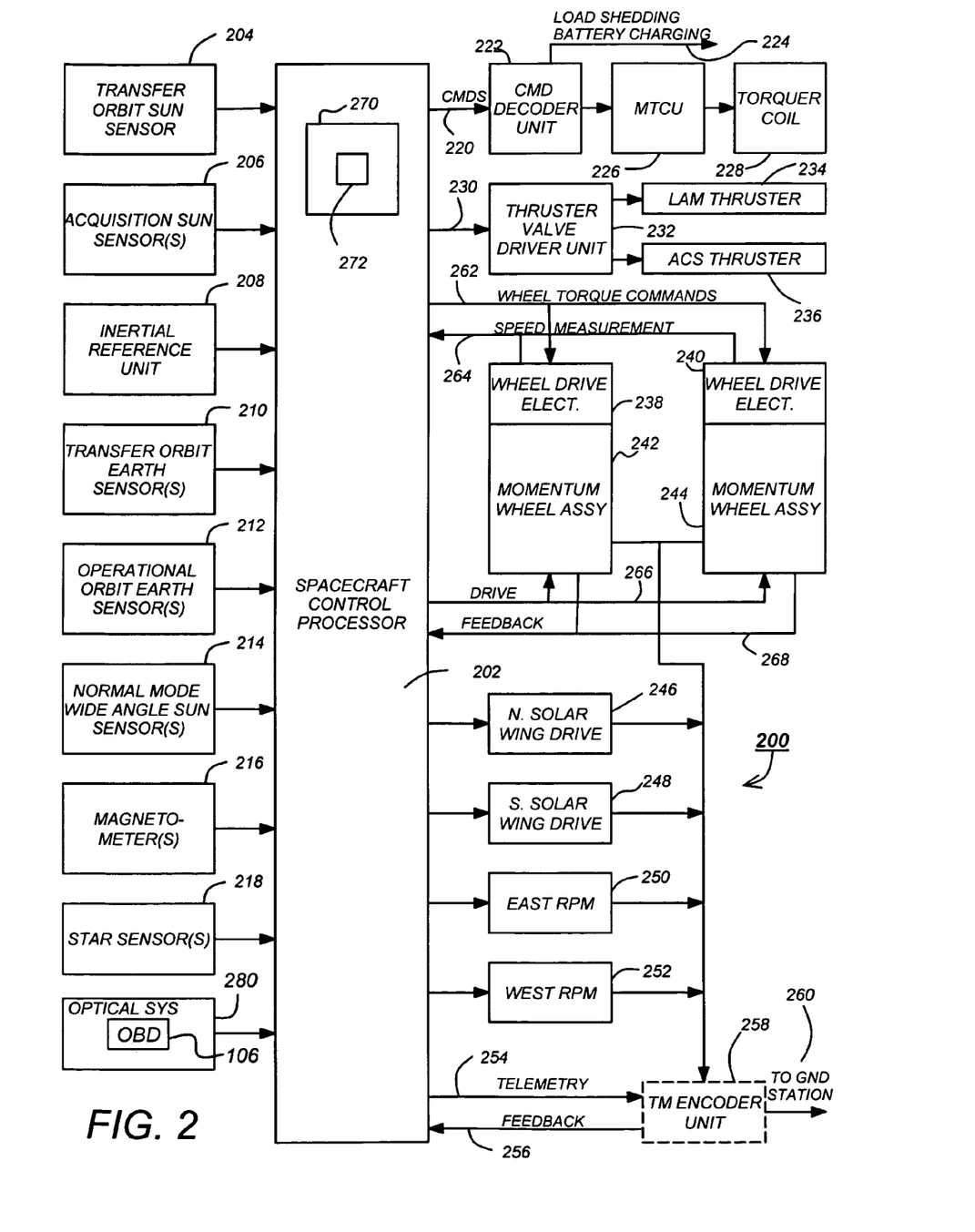
FIG. 2 is a diagram depicting the functional architecture of a representative attitude control system.

FIG. 2 is a diagram depicting the functional architecture of a representative attitude control system 200. Control of the spacecraft is provided by a computer or spacecraft control processor (SCP) 202. The SCP performs a number of functions which may include post ejection sequencing, transfer orbit processing, acquisition control, station keeping control, normal mode control, mechanisms control, fault protection, and spacecraft systems support, among others. The post ejection sequencing could include initializing to assent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The station keeping control could include auto mode sequencing, gyro calibration, station keeping attitude control and transition to normal. The normal mode control could include attitude estimation, attitude and solar array steering, momentum bias control, magnetic torquing, and thruster momentum dumping (H-dumping). The mechanisms mode control could include solar panel control and reflector positioning control. The spacecraft control systems support could include tracking and command processing, battery charge management and pressure transducer processing.

Input to the spacecraft control processor 202 may come from a any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218.

The SCP 202 generates control signal commands 220 which are directed to a command decoder unit 222. The command decoder unit operates the load shedding and battery charging systems 224. The command decoder unit also sends signals to the magnetic torque control unit (MTCU) 226 and the torque coil 228.

The SCP 202 also sends control commands 230 to the thruster valve driver unit 232 which in turn controls the liquid apogee motor (LAM) thrusters 234 and the attitude control thrusters 236.

Wheel torque commands 262 are generated by the SCP 202 and are communicated to the wheel speed electronics 238 and 240. These effect changes in the wheel speeds for wheels in momentum wheel assemblies 242 and 244, respectively. The speed of the wheels is also measured and fed back to the SCP 202 by feedback control signal 264.

The spacecraft control processor also sends jackscrew drive signals 266 to the momentum wheel assemblies 243 and 244. These signals control the operation of the jackscrews individually and thus the amount of tilt of the momentum wheels. The position of the jackscrews is then fed back through command signal 268 to the spacecraft control processor. The signals 268 are also sent to the telemetry encoder unit 258 and in turn to the ground station 260.

The spacecraft control processor also sends command signals 254 to the telemetry encoder unit 258 which in turn sends feedback signals 256 to the SCP 202. This feedback loop, as with the other feedback loops to the SCP 202 described earlier, assist in the overall control of the spacecraft. The SCP 202 communicates with the telemetry encoder unit 258, which receives the signals from various spacecraft components and subsystems indicating current operating conditions, and then relays them to the ground station 260.

The wheel drive electronics 238, 240 receive signals from the SCP 202 and control the rotational speed of the momentum wheels. The jackscrew drive signals 266 adjust the orientation of the angular momentum vector of the momentum wheels. This accommodates varying degrees of attitude steering agility and accommodates movement of the spacecraft as required.

The use of reaction wheels or equivalent internal torquers to control a momentum bias stabilized spacecraft allows inversion about yaw of the attitude at will without change to the attitude control. In this sense, the canting of the momentum wheel is entirely equivalent to the use of reaction wheels.

Other spacecraft employing external torquers, chemical or electric thrusters, magnetic torquers, solar pressure, etc. cannot be inverted without changing the control or reversing the wheel spin direction. This includes momentum bias spacecraft that attempt to maintain the spacecraft body fixed and steer payload elements with payload gimbals.

The satellite attitude control system 200 also communicates with an optical system 280 that includes the optical beam device 106. The optical system 280 can comprise a laser communication or laser targeting system. These communications can include, for example, measurements of the inertial location and angular attitude of the satellite 100, which is used by the optical system to direct and stabilize the optical beams from the optical beam device 106.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 100 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, causes the spacecraft processor 202 to perform the steps necessary to implement and/or use the present invention. Computer program and/or operating instructions may also be tangibly embodied in memory 270 and/or data communications devices (e.g. other devices in the spacecraft 10 or on the ground), thereby making a computer program product or article of manufacture according to the invention. As such, the terms "program storage device," "article of manufacture" and "computer program product" as used herein are intended to encompass a computer program accessible from any computer readable device or media.

The present invention can be used to implement a transmission system, a receiver system, a transceiver system or a system of networked transceivers. Such transmission systems can include, for example, low observable beacon, a marker/designator, a data uplink transmitter, a dazzler (for disorienting unfriendlies) or an illuminator. Exemplary transceivers may include a LADAR system, a laser communications terminal or an identification friend or foe (IFF) handshaking system. Networked transceivers can include, for example, a linked lasercom repeater, networked fused sensors, UAV swarm coordination, phase locking control or stereo active sensing.

Furthermore, although the foregoing discloses the use of the present invention using a satellite as a platform, the present invention can be implemented on a variety of different platforms as well, including fixed and mobile platforms. Such platforms can include, for example: commercial or military aircraft; commercial or military terrestrial vehicles such as automobiles, trucks, tanks, or armored personnel carriers; naval vessels; guided weapons; and civilian or military communications installations.

Figure 3:
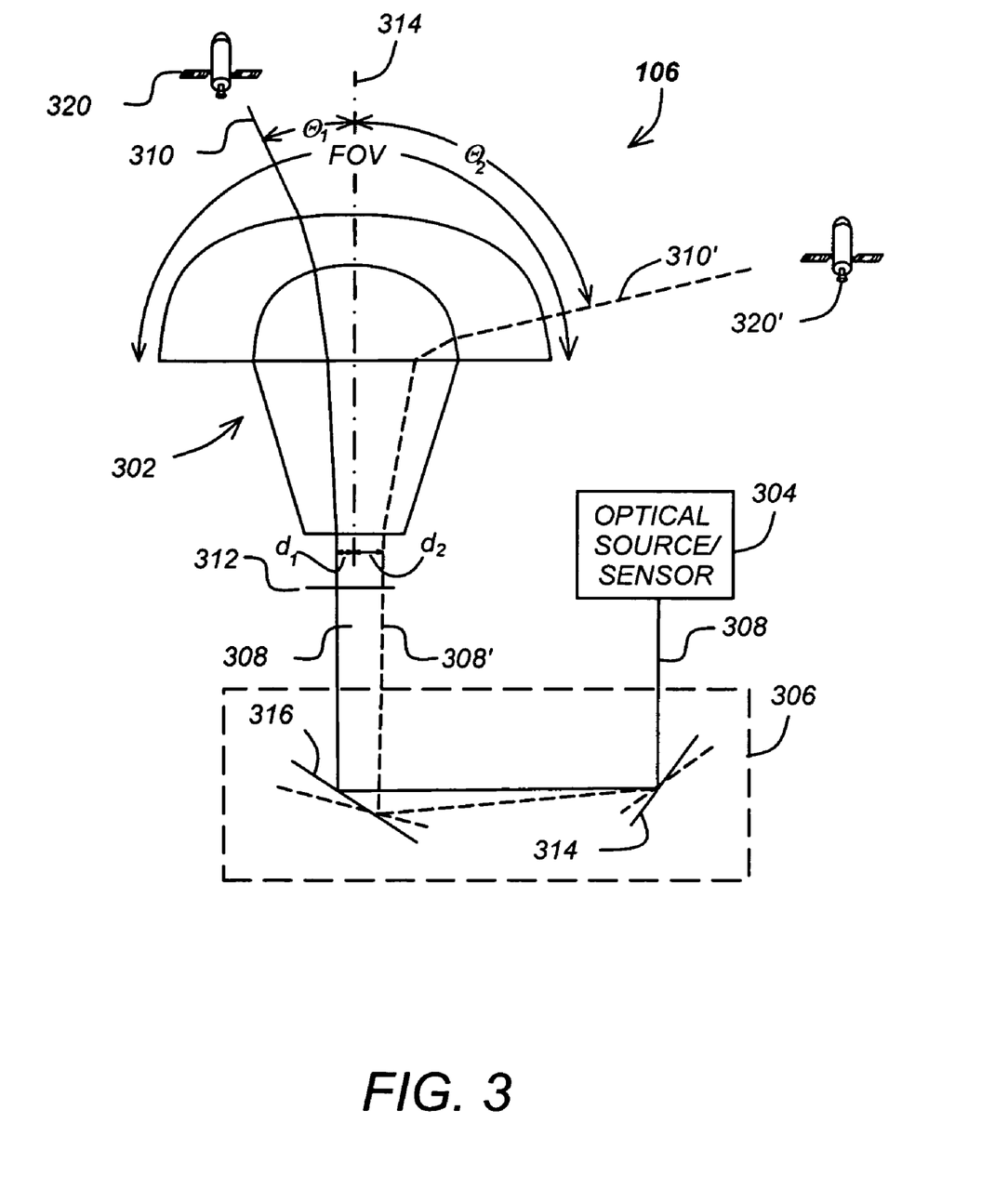
FIG. 3 is a diagram of one embodiment of an optical beam device (OBD)

FIG. 3 is a diagram of one embodiment of the optical beam device (OBD) 106. The OBD 106 comprises an optical source 304 generating a first beam 308, and a steering system 306 for controllably directing a first beam 308 onto a location on an image plane 312 of an optical system 302. The optical system 302 maps directed first beam 308 incident on the image plane 312 to a second beam 310 extending angularly across a field of view (FOV) to an angle from the boresight or centerline 314 of the OBD 106.

In the illustrated embodiment, the steering system 306 comprises a first mirror 314 and an second mirror 316. The first and second mirrors 314, 316 are rotated to steer the beam 308 emanating from the optical source 304 to different locations on the image plane 312. For example, if mirrors 314 and 316 are rotated to the orientation shown in the solid line lines, the first beam 308 is directed to be incident upon the image plane 312 at a location $d_1$ from the center of the image plane 312, and the resulting second beam is directed at an angle $\Theta_1$ from the centerline 314 of the OBD 106 and at a first target 320. If mirrors 314 and 316 are rotated to the orientation shown in the dashed lines, the first beam 308' is rotated to a different distance $d_2$ from the center of the image plane 312, and the resulting second beam is directed at an angle $\Theta_2$ from the centerline 314 of the OBD 106 and at a second target 320'. Since mirrors 314, 316 can be moved rapidly, second beam 310 can be directed from one angle to another at a high rate.

In the illustrated embodiment, two mirrors 314, 316 are used, but a single mirror may be used to accomplish the task as well. Also, the mirrors 314, 316 may be micro mirror assemblies.

FIG. 3 also shows that the optical source 304 may also be an optical sensor. In this case, energy emanating from the target 320 enters the optical system 302 and is mapped to a location on the image plane 312. This energy is then provided to the optical sensor via steering system 306. In this embodiment, the system shown in FIG. 3 comprises an optical receiver having a wide FOV. Of course, the functionality of the optical source and the optical sensor 304 may be combined to provide an optical transceiver as well. This can be accomplished by using devices such as dichroic mirrors, beam splitters, and the like to allow an optical sensor and/or tracker to share the optical path between the optical system 302 and the source 304, as illustrated an discussed further below.

Figure 4:
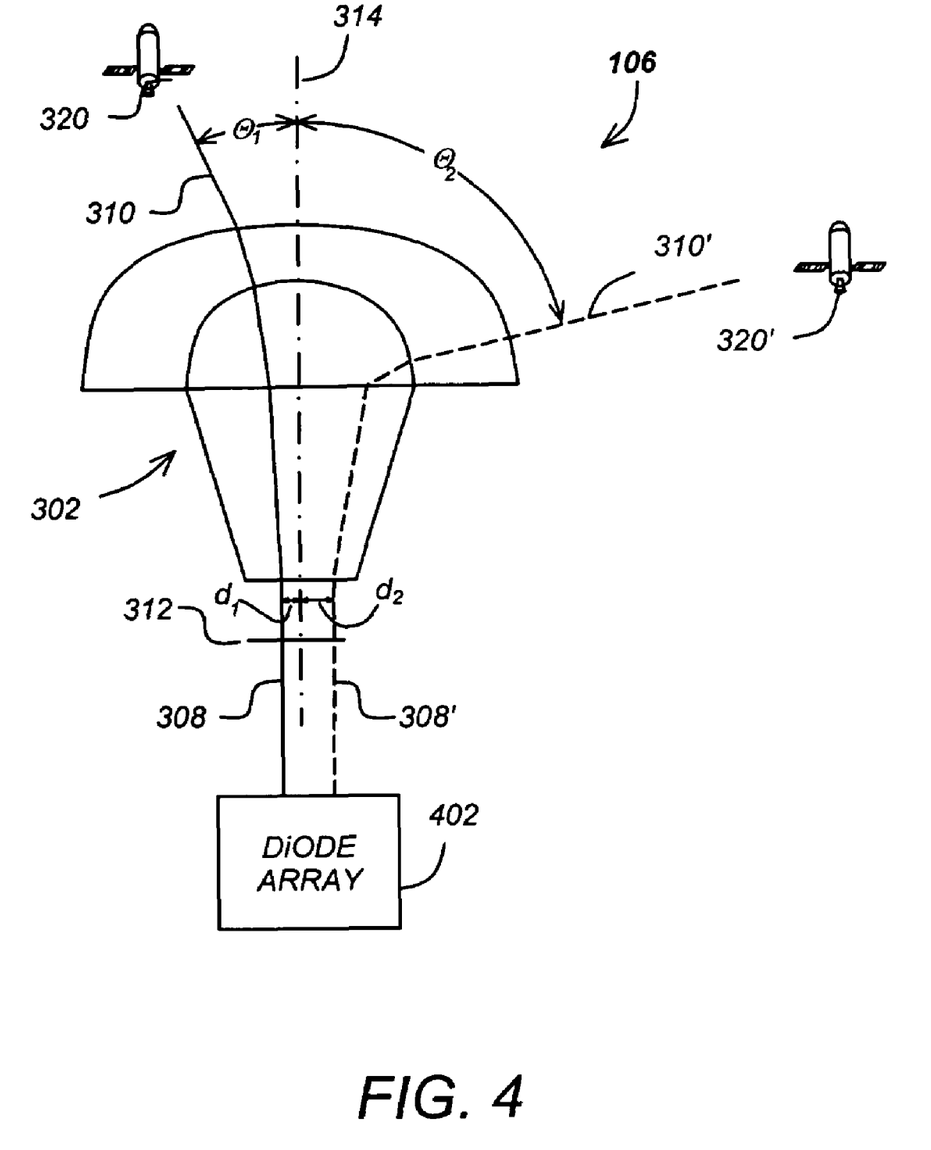
FIG. 4 is a diagram showing an embodiment of the OBD in which the beam steering system and the optical source are embodied in a diode array.

FIG. 4 is a diagram showing an embodiment in which a the beam steering system and optical source are embodied in a diode array 402. The first beam 308 emanates from the one of the diodes in the diode array 402, and becomes incident on the image plane 312 at a distance $d_1$ from the center of the image plane 312. The optical system 302 maps (in the simplified illustration, bends) the first beam 308 to create a second beam 310 extending angularly across the field of view at an angle $\Theta_1$ from the centerline 314 toward target 320. Similarly, a displaced first beam 308' emanates from another of the diodes in the diode array 402, and becomes incident on the image plane 312 at a distance $d_2$ from the center of the image plane 312. The optical system 302 maps the displaced first beam 308' to create a second beam 310' extending angularly across the field of view at an angle $\Theta_2$ from the centerline 314 toward target 320'.

Figure 5:
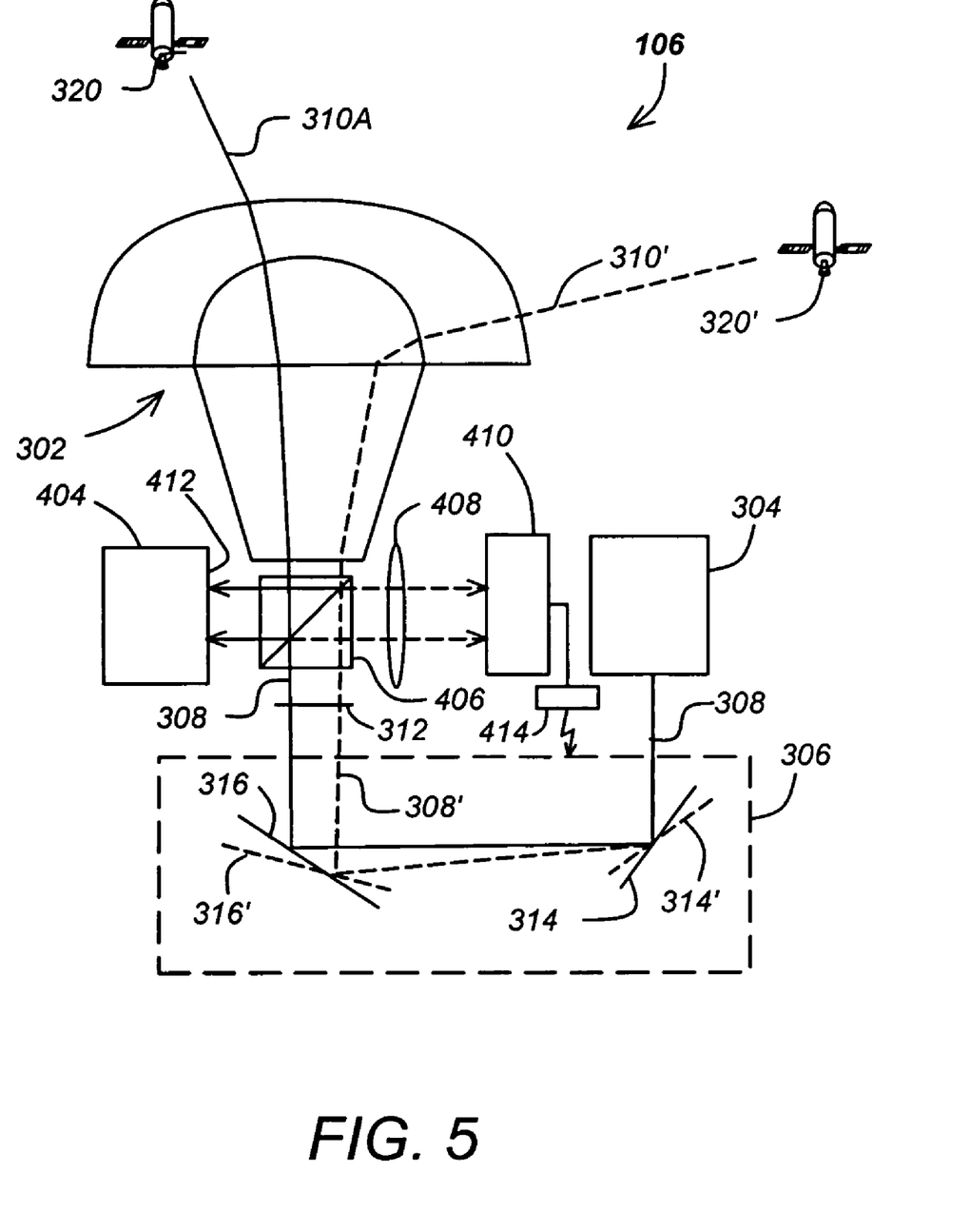
FIG. 5 is a diagram of a further exemplary embodiment of an OBD.

FIG. 5 is a diagram of an exemplary embodiment of the OBD 106. In this embodiment, the OBD 106 is an 106 optical beam active tracking system such as a LADAR system. The OBD 106 includes a means 406 for sharing the optical path between optical system 302 and the optical source 304, and a detector array 404, disposed at a second image plane 412 formed by the optical path sharing means 406. The sharing means 406 allows at least some of the optical energy passing in the optical path from the target 320 through the optical system 302 to be directed to the detector array 404, while also allowing the optical energy from the optical source 304 to pass to the optical system 302 as well. The sharing means 406 may comprise a dichroic mirror or a beam splitter such as a polarization beam splitter. The sharing means 406 renders a second image plane 412 on the surface of the detector array 404.

A first beam 308 emanating from an optical source/sensor 304 is provided to the beam steering system 306, which steers the first beam 308 across the image plane 312. In one embodiment, mirrors 314 and 316 are FSMs, and the f number of the beam is matched to the image plane.

The optical system 302 maps the first beam 308 to a second beam 310, which illuminates a target 320. By use of the steering mirrors 314, 316, this second (output) beam 310 is steered over the FOV to remain on the target 320.

Energy reflected from the target 320 enters the optical system 302 and is provided to the sharing means 406.

The sharing means 406 provides some of the energy from the optical system to the optical source/sensor 304 via the beam steering system 306. The optical source/sensor 304 receives this energy and uses the energy to determine the precise location and/or range to the target 320. The embodiment, the optical source 304 is an optical transceiver such as a LADAR system.

The sharing means 406 may also provide some of the energy from the optical system 302 to an image plane 412 of the detector array 404. The detector array 404 senses this image using this optical energy and thus detects one or more targets 320 in the region of interest.

The sharing means may also provide some of the energy to an focal plane array (FPA) 410, optionally through a focusing lens 408. The FPA 410 uses the optical energy from the sharing means to track the target 320, and provides this information to the a correlator 416, which correlates the location of the directed first beam 308 on the image plane 312 to the location of the target 320 being tracked, and provides this information to the steering system 306 via an information link such as an electrical connection. Thus, the passive sensor or detector array 404 detects targets 320 in an broad area of interest, those targets are illuminated by the steered second beam 310, and the energy reflected from the targets is used by the FPA 410 to provide the information necessary to assure that the first beam 308 is steered to the proper location on the focal plane 312 so that the second beam 310 remains on the target 320.

Figure 6:
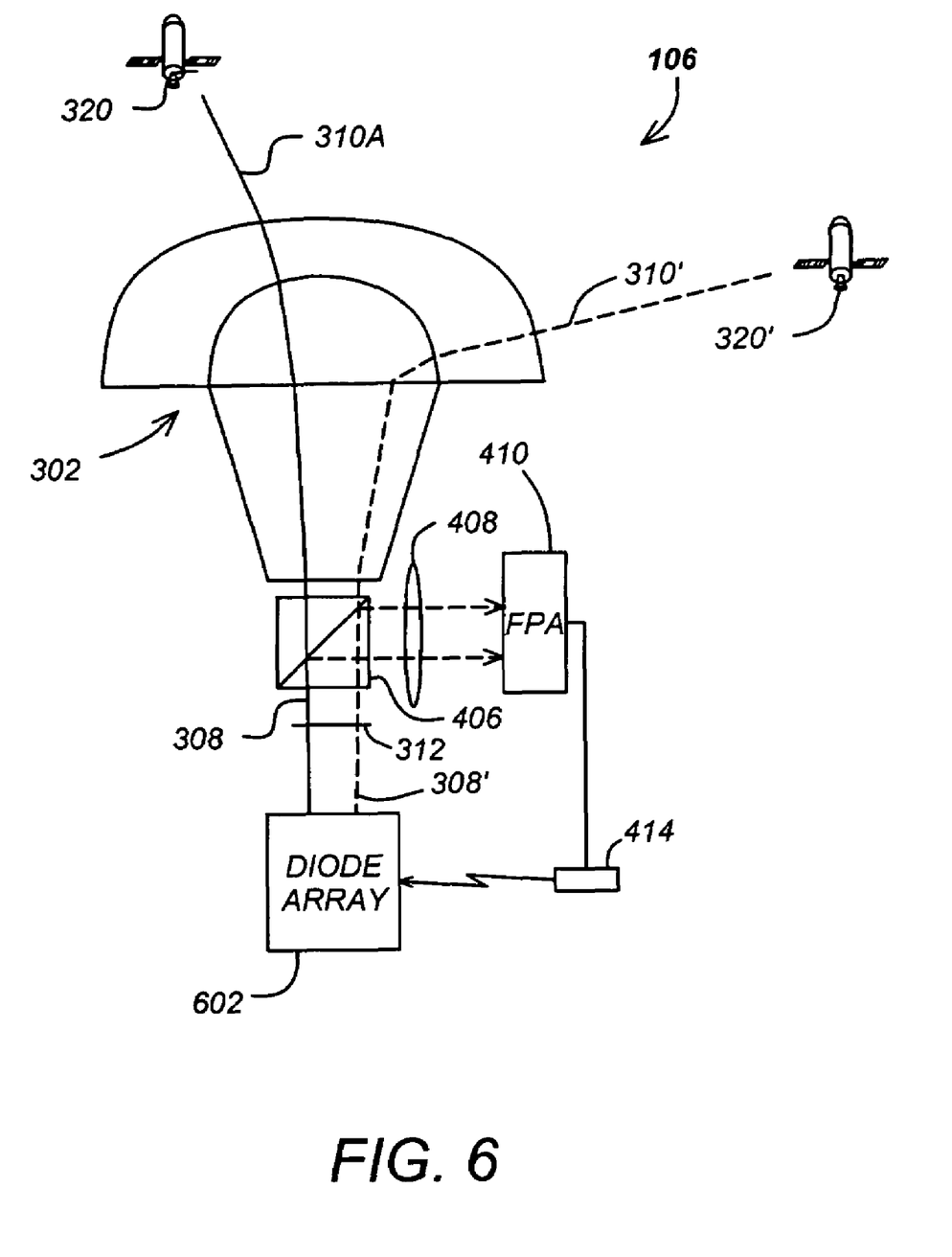
FIG. 6 is a diagram illustrating an alternative tracking system OBD design.

FIG. 6 is a diagram illustrating an alternative active tracking system OBD 106 design. For purposes of simplification, the optional detector array 404 used to targeting purposes is not illustrated. In this embodiment, the FSMs 314, 316 and optical source 304 have been replaced by an array of optical energy point sources that are each associated with pixels in the FPA 410. The optical energy point source may comprise a strand of an fiber optic bundle or a diode in a diode array 602 as shown in FIG. 6. In this embodiment, each element in the array 602 provides a beam that illuminates a different portion of the image plane 312, and is therefore mapped to a different angular region of the FOV. One advantage of this embodiment is that since multiple optical point sources are provided, simultaneous illumination of multiple targets is possible.

Figure 7:
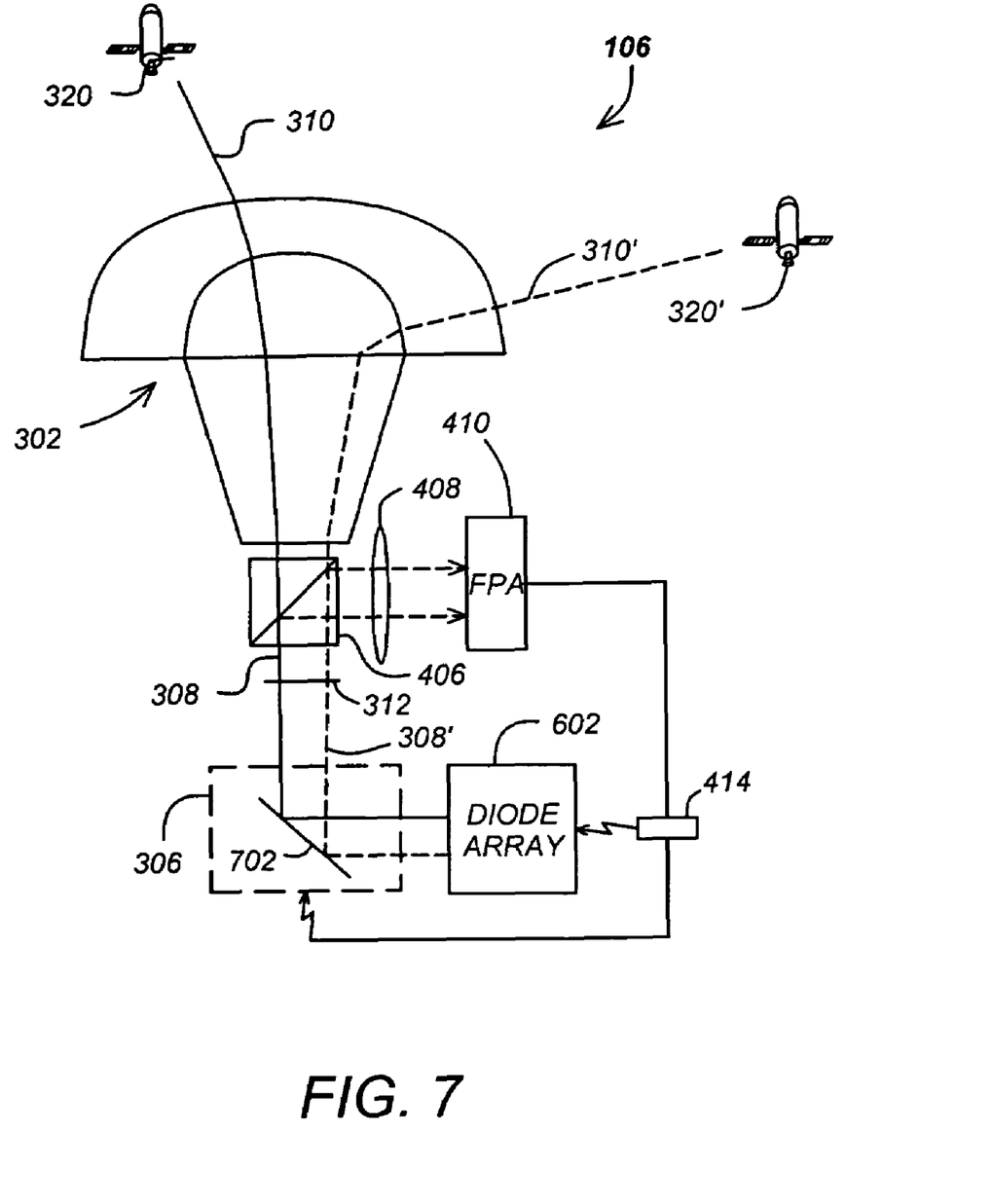
FIG. 7 is a diagram of an OBD using an hybrid tracing system.

FIG. 7 is a diagram of a hybrid active tracking system OBD 106 that uses both an array of optical sources and an optical reflector 702. In this embodiment, the optical energy from the array 602 is provided to an optical reflector 702 such as an FSM or an array of individually controllable micro mirrors (micro mirror array). The optical reflector 702 is controlled using the output of the correlator 414. This embodiment permits very high speed scanning along with precision illumination. This is possible because the array 602 can be used to instantly switch the beam to a particular angular region of the FOV, while the optical reflector 702 can be used to precisely direct the beam 310. This embodiment is also particularly useful to illuminate and track multiple targets at one time.

Figure 8:
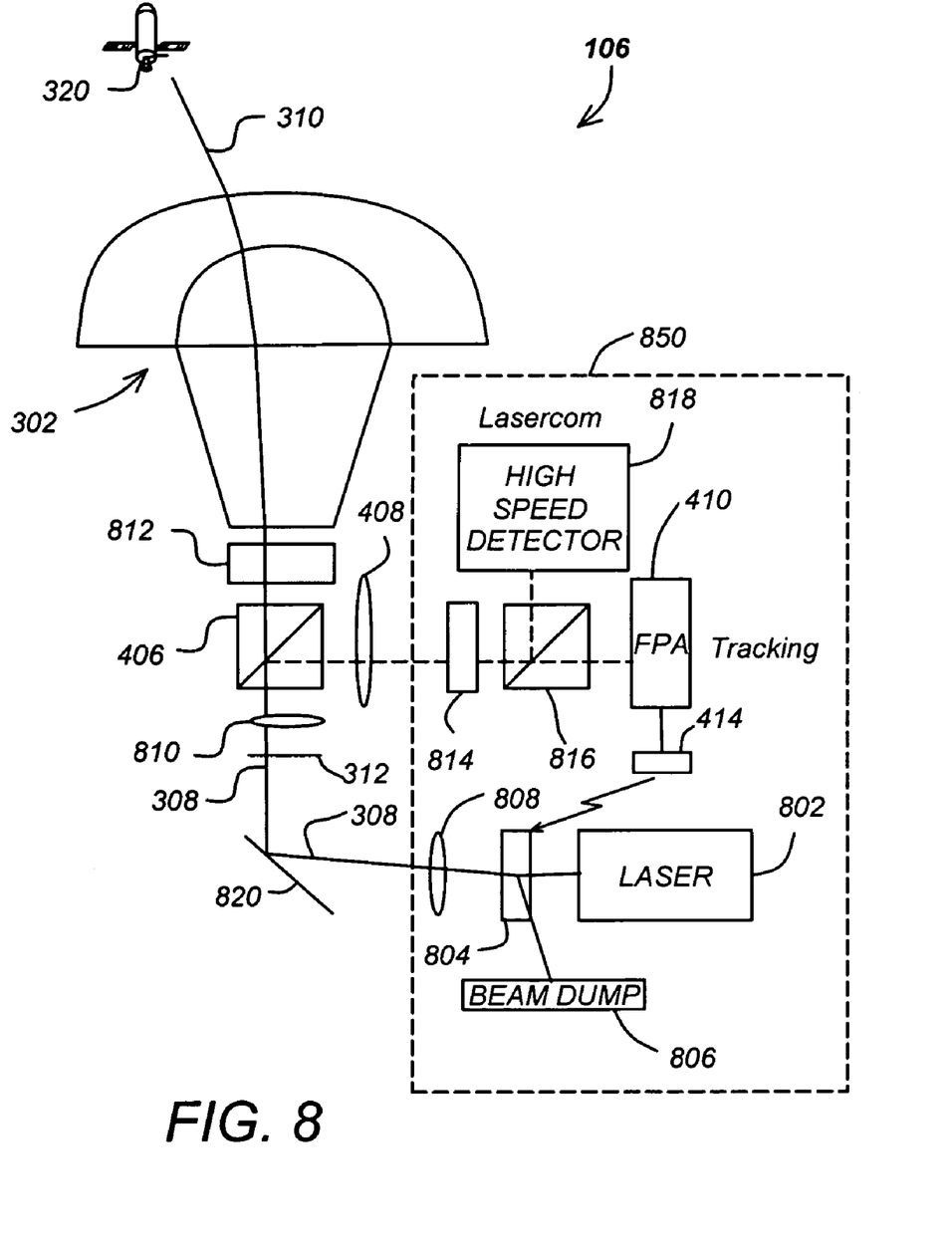
FIG. 8 is a diagram of a laser-based communications system embodiment of the OBD.

FIG. 8 is a diagram of an laser-based communications transmitter and receiver (transceiver) using a micro-mirror assembly that permits parallel transmission of optical energy. This embodiment is particularly useful for covert inter unmanned airborne vehicle (UAV) coordination and communication, and low observable active sensing.

In this embodiment, a laser transceiver 850 comprises a laser transmitter and a narrow field of view laser receiver. The laser transceiver 850 comprises laser 802 providing optical energy having an optical data communication uplink signal to a micro-mirror assembly 804. The micro-mirror assembly 804 bends the optical energy to direct the first beam 308 into the image plane 312 via focusing lens 808 and fixed mirror 820. Optical energy that is not to be provided to the optical system is dumped to beam dump 806. The bent first beam 308 is applied to a second lens 810 and to an optical path sharing means 406 such as a beam splitter 406, and to the optical system 302 via a ¼ wavelength polarizer 812. The beam is then mapped by the optical system to the second beam 310 that is directed towards the target 320, which, in this embodiment, comprises an optical communications data receiver. Since the micro-mirror assembly 804 comprises a plurality of mirrors, a number of beams may be generated from the laser 802 and directed to different targets in different locations.

Optical energy from the target 320 (energy from a laser on board the second target 320 transmitting optical data) then received by the receiver portions of the laser transceiver 850. The energy is passed through the optical system 320, and the polarizer 812 and applied to the optical path sharing means 406. At least some of the optical energy is redirected to the FPA 410 and a high speed detector 818 that is used to detect the signal from the target 320, and to a FPA 410 that is used to track the target 320 and redirect the first beam 308 to ensure that it remains on the target 320. The optical energy from the optical path sharing means 406 is passed through lens 408 and a narrow bandwidth optical filter (NBF) (814), and thence to a second optical path sharing means 816, which directs the optical energy to both a high speed detector 818 and the FPA 410. The FPA 410 senses the position of the optical energy and provides this information to the correlator 414. The correlator 414 correlates this information to the targets in the FOV and provides an error signal to the micro-mirror assembly 804 to steer the first beam 308 accordingly.

Figure 9:
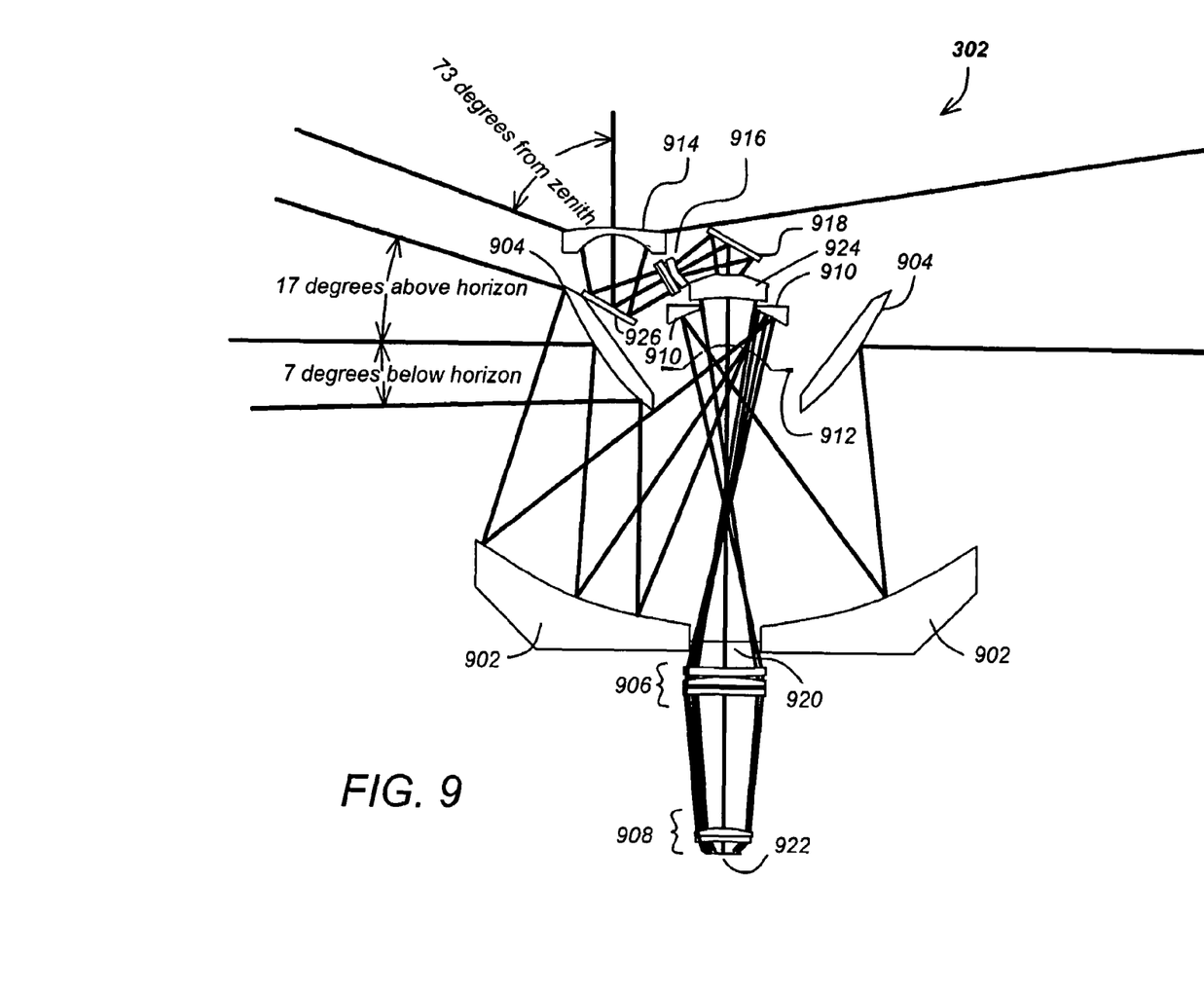
FIG. 9 is a diagram of one embodiment of the optical system used in the OBD.

FIG. 9 is a diagram of one embodiment of the optical system 302. In this embodiment, translations of an f number matched point source across the focal plane 922 are mapped across a field of regard (FOR) that extends approximately −7 degrees to 90 degrees in elevation and 0 to 360 degrees in azimuth. The optical system 302 includes a focal plane field group 908 and a relay group 920 focusing energy through an aperture stop 920 in the secondary mirror 902 to a tertiary mirror 910 and a lens/mirror group formed by objective lens 914, mirrors 926 and 918, and minor lens group 916. The optical energy focused on the tertiary mirror 910 is reflected to the secondary mirror 902 and thence to the primary mirror 904 to provide the FOR from 7 degrees below the horizon to 17 degrees above the horizon. The FOR for 73 degrees below zenith is provided by the optical energy focused and reflected by the lens/mirror group.

Further details regarding the design and applications for this embodiment of the optical system 302 are provided in the following publications, all of which are hereby incorporated by reference herein: U.S. Pat. No. 5,502,309 for a "Staring Sensor," issued Mar. 26, 1996; U.S. Pat. No. 5,534,697 for "Electro-Optical Sensor System for use in Observing Objects," issued Jul. 9, 1996; U.S. Pat. No. 5,627,675, for "Optics Assembly for Observing a Panoramic Scene," issued May 6, 1997; U.S. Pat. No. 5,841,589 for "Panoramic Optics Assembly Having Initial Flat Reflective Unit," issued Nov. 24, 1998; U.S. Pat. No. 5,883,713, for "Ultra Fast Fourier Transform Spectrometer with Rotating Scanning Cube," issued Mar. 16, 1999; U.S. Pat. No. 6,072,524 for "Observation Post with Communications Relay," issued Jun. 6, 2000; U.S. Pat. No. 6,450,455 for "Method and Sensor for Capturing Rate and Position and Stabilization of a Satellite Using at Least One Focal Plane," issued Sep. 17, 2002, and U.S. Pat. No. 6,501,419, for "Sensor System and Method for Determining Yaw Orientation of a Satellite," issued Dec. 31, 2002.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A device for steering energy over a wide field of view (WFOV), comprising:
   a beam steering system for directing a first beam from an optical source across an image plane; and
   a WFOV optical system having the image plane, the WFOV optical system mapping the directed first beam incident on the image plane with a second beam extending angularly across the field of view;
   means for sharing an optical path between the WFOV optical system and the optical source;
   a detector array, disposed at a second image plane formed by the optical path sharing means;
   a tracking system, for tracking targets sensed by the detector array using the shared optical path; and
   a correlator for correlating the location of the directed first beam on the image plane to a location of the tracked targets.

2. The device of claim 1, wherein the means for sharing the optical path is selected from the group comprising:
   a dichroic mirror; and
   a polarization beam splitter.

3. The device of claim 1, wherein the second beam is a signaling beam that can be observed only over a narrow field of view of less than about one degree.

4. The device of claim 1, wherein the steering system steers the directed first beam to direct the second beam to track one or more targets tracked by the tracking system.

5. The device of claim 1, wherein the second beam comprises an optical communication data uplink signal, and the steering system steers the directed first beam to direct the second beam at an optical communications data receiver tracked by the tracking system.

6. The device of claim 1, wherein the steering system steers the directed first beam to direct the second beam at the one or more humans tracked by the tracking system for purposes of disorienting the humans.

7. The device of claim 1, wherein the steering system steers the directed first beam to direct the second beam to illuminate an area around the one or more targets.

8. The device of claim 1, wherein the second beam comprises an illumination beam illuminating a selected field of regard (FOR).

9. The device of claim 1, wherein the steering system steers the directed first beam to direct the second beam to illuminate the selected FOR.

10. The device of claim 1, further comprising:
   a narrow field of view receiver sensitive to the wavelength of the optical source and;
   a second means for sharing the optical path with the narrow field of view receiver.

11. The device of claim 10, wherein the second means for sharing the optical path with the narrow field of view receiver is selected from the group comprising:
   a polarization beam splitter;
   a hole mirror; and
   a sub-aperture hole mirror.

12. The device of claim 1, wherein the second beam extends angularly at least 90 degrees in elevation and approximately 360 degrees in azimuth.

13. A device for steering laser energy over a wide field of view, comprising:
   a wide field of view (WFOV) optical system for directing laser energy; and
   a means for steering said laser energy onto an image plane of said WFOV optical system;
   wherein a displacement of said laser energy on said image plane results in an angular displacement of the laser energy upon exiting said WFOV optical system;
   means for sharing an optical path between the WFOV optical system and a source of the laser energy;
   a detector array, disposed at a second image plane formed by the optical path sharing means;
   a tracking system, for tracking targets sensed by the detector array using the shared optical path; and
   a correlator for correlating the location of the steered laser energy on the image plane to a location of the tracked targets.

14. The device of claim 13, further comprising a laser transceiver for generating the laser energy and receiving laser energy reflected from targets and through the WFOV optical system.

15. The device of claim 13, wherein the angular displacement of the laser energy extends approximately 90 degrees in elevation and approximately 360 degrees in azimuth.

16. A method of steering a optical energy over a field of view (FOV), comprising the steps of:
   directing a first beam from a optical source onto an image plane;
   optically mapping the directed first beam incident on the image plane with a second beam extending angularly across a field of view;
   steering the first beam across the image plane;
   optically mapping a reflected beam from an angular position across the field of view to a location on the image plane;
   detecting the optically mapped and reflected beam;
   tracking detected targets using the detected optically mapped and reflected beam, wherein the optically mapped and reflected beam shares an optical path with the optical source; and
   correlating the location of the directed first beam on the image plane to a location of the tracked targets.

17. The method of claim 16, wherein the second beam is a signaling beam that can be observed only a narrow field of view.

18. The method of claim 16, wherein the first beam is steered to direct the second beam to the tracked targets.

19. The method of claim 16, wherein the second beam comprises an optical communication data uplink signal, and the first beam is steered to direct the second beam at an optical communications data receiver.

20. The method of claim 16, wherein the first beam is steered to direct the second beam to illuminate an area around the tracked targets.

21. The method of claim 16, wherein the first beam is steered to direct the second beam to illuminate a selected field of regard.

* * * * *

UNITED STATES PATENT AND TRADEMARK OFFICE
CERTIFICATE OF CORRECTION

PATENT NO. : 7,657,183 B2  Page 1 of 1
APPLICATION NO. : 11/603877
DATED : February 2, 2010
INVENTOR(S) : Drago et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 536 days.

Signed and Sealed this

Thirtieth Day of November, 2010

David J. Kappos
*Director of the United States Patent and Trademark Office*